March 2, 1971 F. A. ALEXANDER, JR Re. 27,082

METHOD OF REHEATING A PARTIALLY COOLED CONTINUOUSLY CAST SLAB

Original Filed Sept. 21, 1967 3 Sheets-Sheet 1

INVENTOR.
FRANK A. ALEXANDER, Jr.
BY
Russell, Chittick & Pfund
ATTORNEYS

March 2, 1971

F. A. ALEXANDER, JR

METHOD OF REHEATING A PARTIALLY COOLED CONTINUOUSLY CAST SLAB

Re. 27,082

Original Filed Sept. 21, 1967

3 Sheets-Sheet 2

INVENTOR.

FRANK A. ALEXANDER, Jr.

BY

Russell, Chittick & Pfund

ATTORNEYS

March 2, 1971 F. A. ALEXANDER, JR Re. 27,082

METHOD OF REHEATING A PARTIALLY COOLED CONTINUOUSLY CAST SLAB

Original Filed Sept. 21, 1967 3 Sheets-Sheet 3

INVENTOR.
FRANK A. ALEXANDER, Jr.
BY
Russell, Chittick & Pfund
ATTORNEYS

United States Patent Office

Re. 27,082
Reissued Mar. 2, 1971

27,082

METHOD OF REHEATING A PARTIALLY COOLED CONTINUOUSLY CAST SLAB

Frank A. Alexander, Jr., West Boylston, Mass., assignor to Morgan Construction Company, Worcester, Mass.

Original No. 3,451,664, dated June 24, 1969, Ser. No. 669,480, Sept. 21, 1967. Application for reissue Sept. 2, 1969, Ser. No. 856,863

Int. Cl. F27b *9/14*

U.S. Cl. 263—52 2 Claims

Matter enclosed in heavy brackets [ ] appears in the original patent but forms no part of this reissue specification; matter printed in italics indicates the additions made by reissue.

ABSTRACT OF THE DISCLOSURE

The invention relates to a process for reheating a slab *or billet* of metal that has just been removed from a continuous casting process whereby the reheated slab *or billet* may then be sent directly from the reheating furnace to the rolling mill. The reheating process of the present invention is applied to a slab *or billet* in which the interior thereof is hotter than the exterior. Because of the inverted temperatures, the character of the heating must differ substantially from the conventional type of reheating applied to a cold slab *or billet.*

The process involves the use of a lean fuel of low flame temperature which is arranged to envelop the slab *or billet thereby* to bring the exterior [of the slab] up to rolling temperature, while at the same time the interior of the slab *or billet* is decreasing to the rolling temperature. A uniform rolling temperature throughout the slab *or billet* is obtained in less than half the time required to bring a cold slab *or billet* up to the same temperature.

BACKGROUND OF THE INVENTION

This invention will be explained in terms of the steel industry, but it will be understood that it is also applicable to other fields, such as copper and aluminum. The invention has particular relation to the continuous processing of steel from the casting stage through the rolling operation. The objective is to take cast steel made by a continuous casting process and then, instead of sending the casting to storage, to immediately reheat it and feed the reheated casting directly to the rolling mill.

The continuous casting of steel is well understood. The usual procedure following the pouring of the steel into the mold is to cool the surface at least enough to produce a rigid shell about the casting (the interior may still be in molten condition), and then remove the casting after it has been cut to appropriate length, to a storage position where it will cool for subsequent use. Thereafter, the cooled slab or billet [(hereinafter the material will be referred to as a slab)] is taken from storage placed in a reheating furnace, brought up to the desired temperature for the subsequent rolling operation, and then fed to the rolls for final processing.

Up to the present, it has not been possible to feed a slab *or billet* produced by the continuous casting process directly to the rolling mill because the temperature of the slab *or billet* following the continuous casting process and initial essential cooling is not at the uniform temperature required for rolling. In fact, the surface temperature of the slab *or billet* is so far below proper rolling temperature, that rolling would be impossible. No procedure up to the present has been devised for taking the slab *or billet* directly from the continuous casting process and, while still hot but non-uniformly so, bringing its temperature to uniform rolling temperature so that rolling may immediately follow.

When a continuously cast slab *or billet* is removed from the casting machine, it will be found that its surface temperature has been reduced by the cooling medium to something in the order of 1600° F. This low temperature is necessary to solidify the exterior sufficiently to prevent the still molten interior from melting its way through the outer surface. Therefore, while it is not necessary to cool the entire continuously cast slab *or billet* below the melting point before removal from the casting machine, it is necessary to have the exterior temperature sufficiently lowered so that the still fluid interior cannot escape.

If the continuously cast slab *or billet,* cut to a suitable length for the subsequent rolling operation, is to have the heat still present therein conserved, [the slab] *it* must be fed immediately to a reheating furnace in which the objective would be to allow the still hot interior at perhaps 2450° F. to cool to rolling tmperature, for example 2300° F., while at the same time raising the temperature of the exterior parts of the slab *or billet* from a temperature of about 1600° F. to the 2300° F. rolling temperature.

If such reheating should be attempted in a conventional reheating furnace designed to heat cold *slabs or* billets, it would be found that the customary temperatures used therein would heat the exterior of the slab *or billet* far too quickly and continue the molten condition of the interior. The result would be that the molten interior would melt the exterior shell in spots and escape therefrom.

Accordingly, the present process involves steps which will insure sufficiently slow reheating of the exterior of the slab *or billet* to rolling temperature to permit the interior to solidify and the interior temperature to drop gradually to the rolling temperature. The ideal result is to have all parts of the slab *or billet* arrive at the desired rolling temperature at substantially the same time.

SUMMARY

In the light of the foregoing, it will be understood that the invention is particularly concerned with the following procedures:

(1) Placing the slab *or billet* immediately in the reheating furnace while [the slab is] still hot with a substantial inverted temperature gradient between the exterior and interior, (2) Applying a reheating flame of spcial character and in a particular way to the slab *or billet* while in the furnace to bring the entire slab *or billet* to rolling temperature in a minimum time, and (3) Discharging the reheated slab *or billet* from the furnace to the rolling mill as soon as uniform rolling temperature has been reached.

Additionally, it will be understood that the output of the reheating furnace or furnaces will be geared to the capacity of the rolling mill to which the reheated slabs or *billets* are delivered. In conventional practice, a cold slab *or a group of billets totalling about the same weight* might be reheated to rolling temperature in about two and one-half hours. According to the practice of the present invention, the reheating time *of a slab or an equal weight of billets* is reduced to approximately 70 minutes. Since the continuously cast slabs *and equivalent volume of billets* come from the continuous casting machine much faster than one every 70 minutes, it will be necessary to have either a long reheating furnace, or several furnaces, it being understood that the output of the continuous casting machine will be no greater than the rolling capacity of the rolling train. Alternatively, if the continuous casting machine produces slabs *or billets* beyond the capacity of a single rolling train, then two or more rolling trains may be used. In the practice of the invention, the saving in fuel for reheating is enormous to say nothing of the saving in inventory, storage space, straightening problems, etc., that are present when the slabs *or billets* are stored prior to reheating.

Referring to the several figures, the regenerative furnace indicated generally at 2, includes conventional checkers 4 and 6 (see FIG. 2) which alternately (1) receive fresh air to be heated by the checkers before mixing the fuel at 8 to be burned and passed through the furnace area 10 to heat the slabs 12, and (2) receive the products of combustion on the way to the stack thereby to heat the checkers prior to reversal of gas flow. This is conventional.

Figure 1:
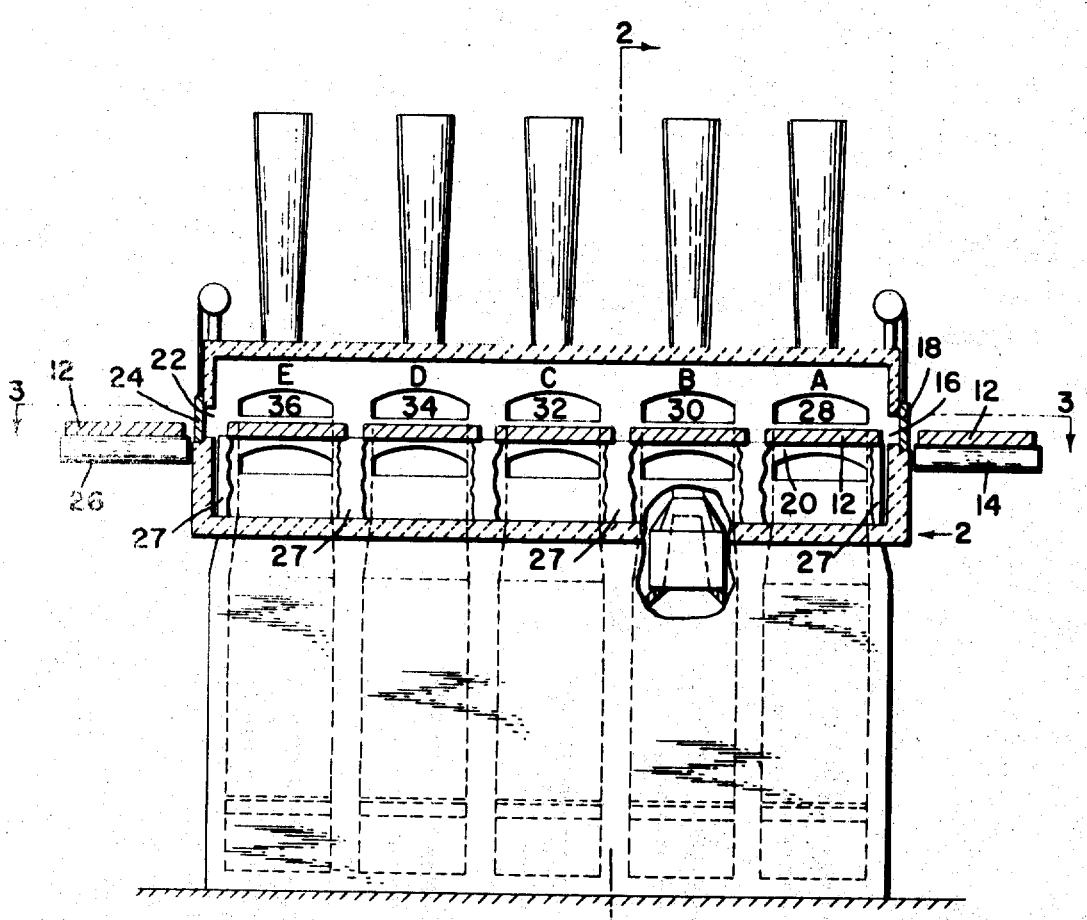
FIG. 1 is a vertical longitudinal section of a regenerative furnace in which the invention may be practiced.
Figure 3:
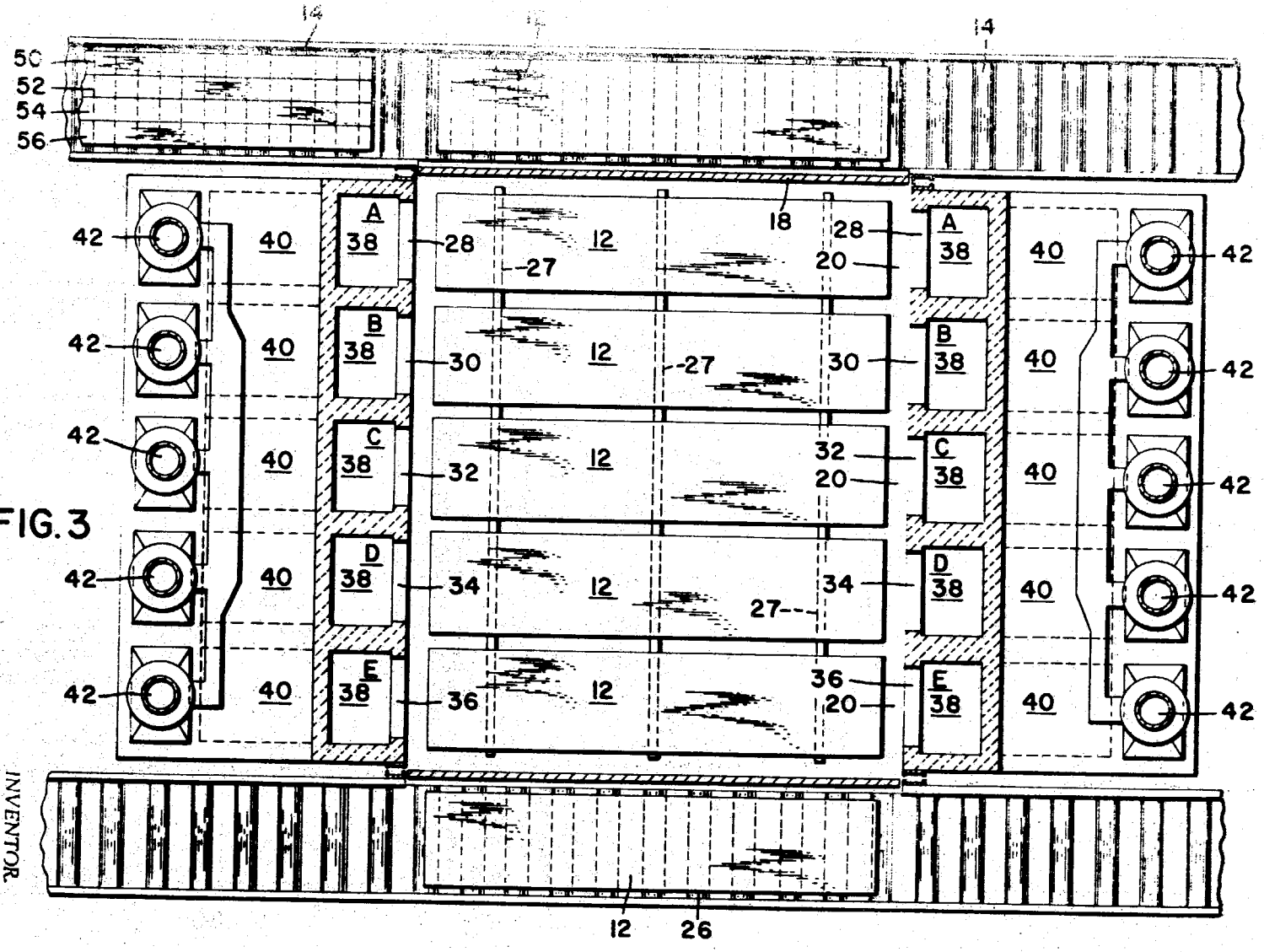
FIG. 3 is a plan view taken on the line 3—3 of FIGS. 1 and 2.

As shown in FIGS. 1 and 3, there are five sets of checkers, A, B, C, D, and E, side by side, each set having opposed ports for alternately producing a flame serving to heat a slab *or billet* temporarily at that location. The number of sets of checkers may be more or less depending on the number of slabs *or billets* required to be within the furnace to give the necessary production. The objective achieved by the plurality of checkers is the ability to control the quality and temperature of the heat applied to each slab *or billet* as it passes through the furnace. Preferably, the slabs *or billets* will be moved, step by step, from one set of checkers to the next, but continuous movement of the slabs *or billets* could be used alternatively.

The slabs *or billets* are brought to the furnace directly from the casting machine on conveyor 14. On reaching entrance 16, the door 18 is raised and the slab *or billet* 12 is pushed by conventional pushing means (not shown) sidewise into the furnace area 20.

As each subsequent slab *or billet* arrives at door 18, it and all preceding slabs *or billets* then in the furnace are pushed in the distance of one checker to the left (as viewed in FIG. 1).

As the slabs *or billets* advance through the furnace, the heat provided at each successive checker position is controlled to produce a temperature condition at the last checker E in which the temperature of the slab *or billet* is substantially uniform throughout and correct for immediate rolling.

When the slab *or billet* 12 reaches exit 22, the door 24 is raised and the slab *or billet* is pushed out onto delivery rollers 26 which convey it directly to the rolling mill.

Figure 2:
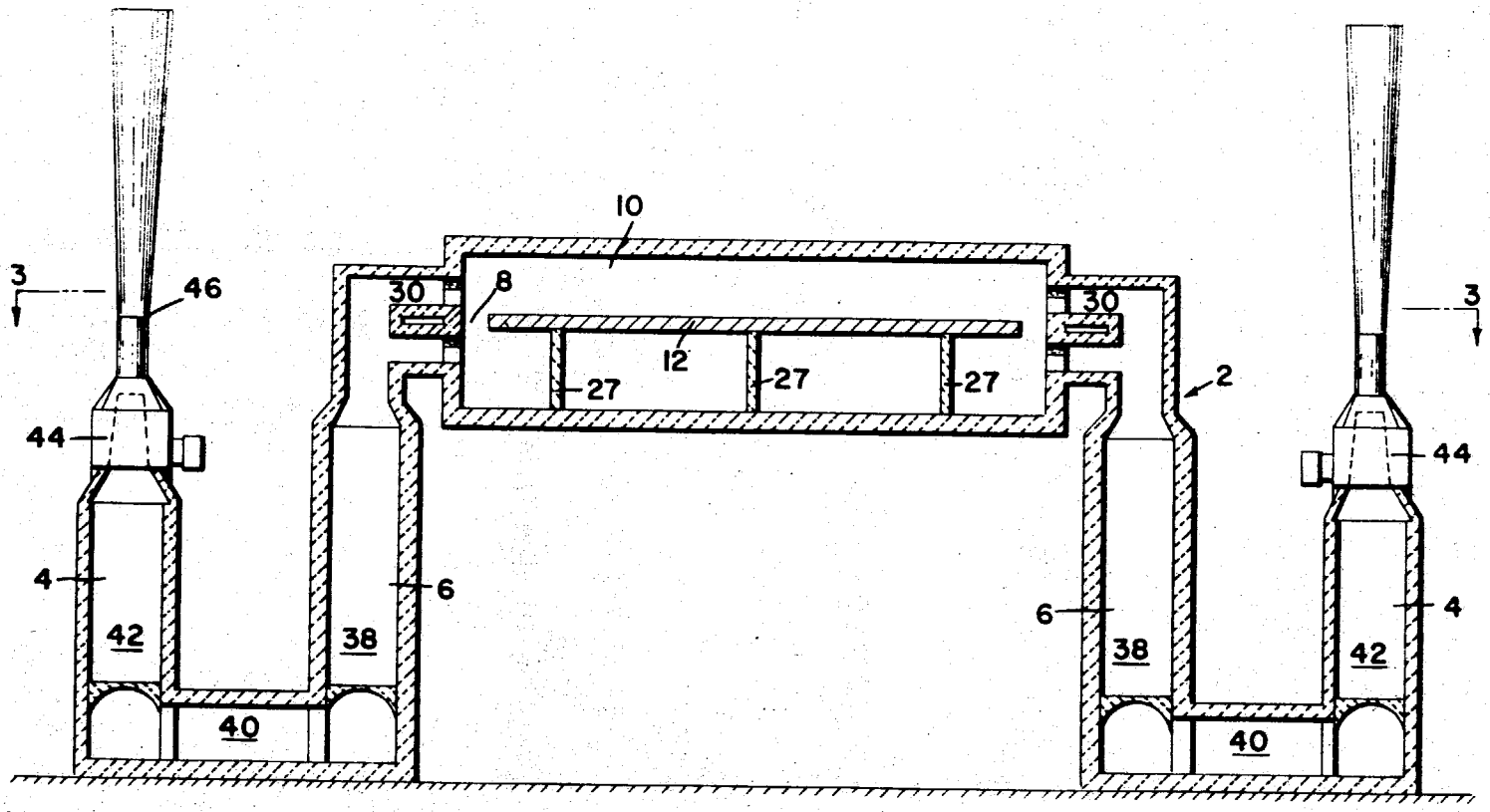
FIG. 2 is a vertical section taken on the line 2—2 of FIG. 1.

Further details of the furnace shown are as follows:

FIGS. 1 and 3 show five ports arranged along each side of the furnace length at the checker positions. These ports in FIG. 1 are numbered 28, 30, 32, 34 and 36. Each port connects with a vertical downdraft checker 38, a horizontal checker 40, and a vertical updraft checker 42, all in series. In FIG. 2 is shown an ejector 44 located above each vertical updraft checker for simplicity of control. Located at the throat 46 of each ejector would be a tight shutoff reversing valve (not shown) all of which is conventional. This system would fire alternately from one side while drafting through the opposite side, reversing approximately every three to four minutes.

*In the system illustrated in the drawing, an ejector 44 has been indicated for each port. This allows independent control of draft at each port for varying the quantity of ejection air. When the throat valve is closed, the airflow is then controlled for combustion purposes. All valves are located on the cold side of the system. This arrangement is ideal since it provides the capability of changing from lean to rich gas if necessary.*

The slab *or billet* 12 on entering the furnace and being placed in alignment with the ports 28 of the first checkers "A" will have a skin temperature which must be raised while at the same time heat is being soaked out of the center to the surface. Experience indicates that one of the best mediums for use in heating hot steel is a lean fuel such as blast furnace gas in combination with preheated air having a temperature of 1750° F. to 2000° F. This fuel provides a large volume of gas with a relatively low flame temperature in the order of 3000° F. Applying this type of flame to the hot steel slab *or billet* enables the lower temperature surface to be heated gradually while soaking the entire piece without weakening the solidified shell.

Another suitable source of lean gas could be developed by mixing nitrogen with rich fuel. Nitrogen and natural gas in the ratio of seven to one would provide a fuel of about 125 B.t.u.'s per cubic foot, with characteristics similar to blast furnace gas or lean mixed gas.

The use of a lean fuel producing a low temperature flame results in a light brittle scale on the slab *or billet* during the reheating process. Since the slabs *or billets* are preferably resting on refractory supports 27 while being pushed through the furnace either step by step or continuously, the flame may completely envelop the slab *or billet* with resulting high uniformity of slow heat application to the surface while the interior heat is soaking out, thereby avoiding any bleeding of the initially molten interior through the surface skin.

The furnace herein described comprised of five identical checkers, A, B, C, D and E, could reheat 140 tons of cast slabs per hour. The slabs in such case would be 80″ wide, 10″ thick and 30′ long. If greater production were needed, other furnaces could be added, or the single furnace lengthened. *The furnace likewise would reheat a similar weight of billets in substantially the same time.*

It has been discovered that if [the] slabs are delivered to the furnace from the continuous casting machine with an average temperature of 1700° F., the staying time in the furnace would be only approximately 70–75 minutes, and a furnace fuel input of approximately 65,000 B.t.u.'s per hour would be required at maximum production.

[In the system illustrated in the drawing, an ejector 44 has been indicated for each port. This allows independent control of draft at each port for varying the quantity of ejection air. When the throat valve is closed, the airflow is then controlled for combustion purposes. All valves are located on the cold side of the system. This arrangement is ideal since it provides the capability of changing from lean to rich gas if necessary.]

[While the foregoing description has been directed to the reheating of slabs, it will be appreciated that reheating of billets delivered to the furnace in hot condition could also be readily accomplished. The billets would normally be delivered to the furnace area at a temperature somewhat below the temperature of the heretofore referred to slab. This average temperature would be about 1550° F.] *On the other hand, continuously cast billets, cooled more readily than slabs because of their greater surface areas per unit of weight, would normally be delivered to the furnace at an average temperature somewhat below the temperature of slabs, namely at about 1550° F.* The billets delivered to the furnace might be handled in small groups. For example, with a four-strand billet casting machine, a group of four billets indicated at 50, 52, 54 and 56 on the conveyor 14 in FIG. 3 would arrive simultaneously at the furnace. These would be lined up in a "pack." Each "pack" of billets would be moved as a group through the furnace in much the same manner as the slabs. At the discharge end of the furnace, the billets, if desired, could be separated somewhat by any one of known mechanical methods and would be arranged for side discharge from the furnace into the mill.

It is intended to cover all changes and modifications of the examples of the invention herein chosen for purposes of the disclosure which do not constitute departures from the spirit and scope of the invention.

I claim:

1. The method of reheating a slab *or billet* between a continuous casting process and a rolling process in which, at the commencement of reheating, the exterior temperature of the slab *or billet* is lower than the interior temperature, the said method functioning to bring the slab *or billet* to a final uniform temperature which is intermediate the said original exterior and interior temperatures, said method comprising the steps of moving a hot and at least externally solidified cutoff slab *or billet* directly from the continuous casting process into a reheating furnace of the regenerative type, moving the slab *or billet* through the furnace, and subjecting the slab *or billet* to a succession of hot gas sources directed crosswise of the furnace in alternating directions and having a temperature in the order of 3000° F. produced by the use of a lean fuel which in burning generates a large volume of correspondingly hot gas, whereby the entire slab *or billet* may be enveloped with said hot gas to raise the surface temperature without melting the surface but still provide time for the internal higher temperature of the slab *or billet* to work outwardly to produce the said substantially uniform temperature intermediate the original exterior and interior temperatures in the slab *or billet* before removal from the furnace.

2. The method of reheating a slab *or billet* [of steel] between a continuous casting process and a rolling process in which, at the commencement of reheating, the exterior temperature of the slab *or billet* is lower than the interior temperature, to a final uniform temperature intermediate the original exterior and interior temperatures, comprising the steps of placing the slab *or billet* in a regenerative type furnace having a plurality of side by side sources of flame, advancing the slab *or billet* from one flame source to the next flame source, subjecting substantially the entire surface of the slab *or billet* to a flame produced by the use of a lean fuel having a low flame temperature in the order of 3000° F., and the rate of advance in relation to the time of exposure at each flame source being such that when the slab *or billet* leaves the last flame source, the temperature of the entire slab *or billet* will be substantially uniform and correct for immediate rolling of the slab *or billet*.

References Cited

The following references, cited by the Examiner, are of record in the patented file of this patent or the original patent.

UNITED STATES PATENTS

| | | | |
|---|---|---|---|
| 2,056,904 | 10/1936 | Morton et al. | 263—6 |
| 3,385,579 | 5/1968 | Peck et al. | 263—6 |

JOHN J. CAMBY, Primary Examiner

U.S. Cl. X.R.

164—273